US012753129B2

(12) United States Patent
Hammond

(10) Patent No.: US 12,753,129 B2
(45) Date of Patent: Oct. 6, 2026

(54) METHOD FOR PRODUCING A SOIL CONDITIONING AGENT

(71) Applicant: CCm Technologies Limited, Swindon (GB)

(72) Inventor: Peter Hammond, Swindon (GB)

(73) Assignee: CCm Technologies Limited, Swindon (GB)

(*) Notice: Subject to any disclaimer, the term of this patent is extended or adjusted under 35 U.S.C. 154(b) by 774 days.

(21) Appl. No.: 18/004,401

(22) PCT Filed: Jul. 7, 2021

(86) PCT No.: PCT/GB2021/051739
§ 371 (c)(1),
(2) Date: Jan. 5, 2023

(87) PCT Pub. No.: WO2022/008916
PCT Pub. Date: Jan. 13, 2022

(65) Prior Publication Data
US 2023/0303462 A1 Sep. 28, 2023

(30) Foreign Application Priority Data
Jul. 7, 2020 (GB) ...................................... 2010448
Jul. 7, 2020 (GB) ...................................... 2010449

(51) Int. Cl.
*C05F 11/02* (2006.01)
*C05D 3/00* (2006.01)

(52) U.S. Cl.
CPC ................ *C05F 11/02* (2013.01); *C05D 3/00* (2013.01)

(58) Field of Classification Search
CPC .................................. C05F 11/02; C05D 3/00
See application file for complete search history.

(56) References Cited

U.S. PATENT DOCUMENTS

| | | | |
|---|---|---|---|
| 1,870,131 | A | 8/1932 | Meier |
| 3,132,935 | A | 5/1964 | Geiersberger et al. |
| 3,518,071 | A | 6/1970 | Villiers-Fisher et al. |
| 2006/0000782 | A1 | 1/2006 | Bowers et al. |
| 2010/0170845 | A1 | 7/2010 | Baur et al. |
| 2011/0283759 | A1 | 11/2011 | Cisneros et al. |
| 2012/0074058 | A1 | 3/2012 | Zeng et al. |
| 2012/0125064 | A1 | 5/2012 | Joseph et al. |

(Continued)

FOREIGN PATENT DOCUMENTS

| | | | |
|---|---|---|---|
| CA | 2812215 A1 * | 4/2012 | .............. C05F 17/50 |
| CN | 102690000 | 9/2012 | |

(Continued)

OTHER PUBLICATIONS

Garcia-Sanchez, M. et al. "The effectiveness of various treatments in changing the nutrient status and bioavailability of risk elements in multi-element contaminated soil." Environmental Science and Pollution Research. Sep. 2015;22(18):14325-36. doi: 10.1007/s11356-015-4678-1.

(Continued)

*Primary Examiner* — Wayne A Langel
(74) *Attorney, Agent, or Firm* — Howson & Howson LLP; Colleen M. Schaller

(57) ABSTRACT

A method of producing a soil conditioning agent, the method comprising (i) admixing (a) ash from an organic source with (b) an anaerobic digestate.

12 Claims, 2 Drawing Sheets

(56) References Cited

U.S. PATENT DOCUMENTS

| | | | | |
|---|---|---|---|---|
| 2014/0260466 | A1 | 9/2014 | Rehage et al. | |
| 2016/0206994 | A1 | 7/2016 | Reid | |
| 2017/0144940 | A1 * | 5/2017 | Grech | A01N 47/12 |

FOREIGN PATENT DOCUMENTS

| | | | | |
|---|---|---|---|---|
| CN | 104 529 604 A | 4/2015 | | |
| CN | 105712388 A | 6/2016 | | |
| CN | 104 774 125 B | 11/2017 | | |
| CN | 109368946 | 2/2019 | | |
| CN | 110228912 | 9/2019 | | |
| CN | 209352733 | 9/2019 | | |
| DE | 102008050349 A1 | 5/2009 | | |
| DE | 102016122869 A1 | 5/2018 | | |
| DE | 102018000939 A1 | 8/2019 | | |
| DE | 102018101083 A1 | 10/2023 | | |
| DK | 2657212 T3 | 6/2016 | * | C05F 17/50 |
| EP | 0236972 A2 | 9/1987 | | |
| EP | 2149542 A2 | 2/2010 | | |
| EP | 2904892 A1 | 8/2015 | | |
| EP | 3 293 165 A1 | 3/2018 | | |
| ES | 2336176 A1 | 4/2010 | | |
| GB | 339562 A | 12/1930 | | |
| GB | 361267 A | 11/1931 | | |
| GB | 2554624 A | 4/2018 | | |
| KR | 100723066 B | 5/2007 | | |
| WO | WO 2013/108041 A2 | 7/2013 | | |
| WO | WO 2014/033458 A1 | 3/2014 | | |
| WO | WO 2014/044905 A2 | 3/2014 | | |
| WO | WO 2018/127694 A1 | 7/2018 | | |

OTHER PUBLICATIONS

Bougnom, B. P. et al. "Residues from renewable energy production: Their value for fertilizing pastures," Biomass and Bioenergy, Feb. 2012, vol. 39, pp. 290-295, ISSN 0961-9534, https://doi.org/10.1016/j.biombioe.2012.01.017.

Fernandez-Delgado Juarez, M. et al. "Wood ash effects on chemical and microbiological properties of digestate- and manure-amended soils," Biology and Fertility of Soils, 49, 575-585. Jul. 2013. https://doi.org/10.1007/s00374-012-0747-5.

Search report on GB2010448.5 dated Dec. 28, 2020.

Search report on GB2010449.3 dated Dec. 28, 2020.

Search report on GB2010188.7 dated Dec. 7, 2020.

Search report on GB2109606.0 dated Dec. 14, 2021.

Search report on GB2109827.2 dated Jan. 10, 2022.

Firestone et al., Nitrous oxide from soil denitrification: factors controlling its biological production. Science. May 16, 1980;208(4445):749-51.

Wang et al., Soil pH as the chief modifier for regional nitrous oxide emissions: New evidence and implications for global estimates and mitigation. Glob Chang Biol. Feb. 2018;24(2):e617-e626. Epub Nov. 24, 2017.

Obia et al., Effect of Soil pH Increase by Biochar on NO, $N_2O$ and $N_2$ Production during Denitrification in Acid Soils. PLoS One. Sep. 23, 2015;10(9):e0138781. 19 pages.

Bonten et al., Bioslurry as a fertilizer, A literature review. Wageningen, Alterra Wageningen Univeristy & Research Centre, Alterra Report 2519:46. Apr. 2014. 51 pages.

Communication pursuant to Rule 114(2), dated Jun. 24, 2024, with Third Party Observation submitted in European Patent Application No. 21746102.9.

Riding, Matthew J. et al: "Harmonising conflicts between science, regulation, perception and environmental impact: The case of soil conditioners from bioenergy" Environment International, Pergamon Press, US, vol. 75, Nov. 15, 2014 (Nov. 15, 2014), pp. 52-67, XP029116473, ISSN: 0160- 4120, DOI: 10.1016/J.ENVINT.2014.10.025.

Jewiarz, Marcin et al. "Digestate, ash and Trichoderm based fertilizer—production line concept design" MATEC Web of Conferences, vol. 168, Jan. 1, 2018 (Jan. 1, 2018), p. 04004, XP055850609, DOI: 10.1051/matecconf/201816804004. Retrieved from the Internet: URL:https://www.matec- conferences.org/articles/matecconf/pdf/2018/27/ matecconf_xxi.aeanmifmae-2018_04004.pdf.

International Search Report and Written Opinion dated Sep. 20, 2021 issued in International Patent Application No. PCT/GB2021/051691.

International Search Report and Written Opinion dated Nov. 3, 2021 issued in International Patent Application No. PCT/GB2021/051734.

International Search Report and Written Opinion dated Oct. 21, 2021 issued in International Patent Application No. PCT/GB2021/051739.

International Search Report and Written Opinion dated Oct. 20, 2021 issued in International Patent Application No. PCT/GB2021/051737.

Restriction Requirement, dated Sep. 5, 2025, issued in related U.S. Appl. No. 18/004,404.

Non-Final Office Action, dated Jan. 8, 2026, issued in related U.S. Appl. No. 18/004,404.

Non-Final Office Action, dated Feb. 5, 2026, issued in related U.S. Appl. No. 18/004,409.

* cited by examiner

METHOD FOR PRODUCING A SOIL CONDITIONING AGENT

CROSS-REFERENCE TO RELATED APPLICATIONS

This application is a National Stage Entry under 35 U.S.C. 371 of International Patent Application No. PCT/GB2021/051739, filed Jul. 7, 2021, which claims priority to UK Patent Application No. 2010448.5, filed Jul. 7, 2020 and UK Patent Application No. 2010449.3, filed Jul. 7, 2020. These applications are incorporated by reference herein.

The present invention relates to a method of preparing a soil conditioning agent, to a composition prepared by the method and to methods and uses relating thereto. In particular the present invention seeks to provide a soil conditioning agent that is prepared from one or more waste products. It is a further aim of the invention to provide a means for storing carbon.

As the world's population grows there is an ever increasing need to maximise resources, reduce waste and recycle as much as possible. In particular it is essential to reduce waste that is sent to landfill and to reduce emissions of carbon dioxide. Furthermore there is a need to maximise crop yield and thus the provision of safe and effective fertilisers and conditioning agents is very important.

Reduction of carbon emissions can be achieved by finding effective means for storing carbon.

According to a first aspect of the present invention there is provided a method of producing a soil conditioning agent, the method comprising (i) admixing (a) ash from an organic source with (b) an anaerobic digestate.

Preferably step (i) of the method further involves the addition of (c) a source of nitrate ion and/or a source of sulfate ion.

Component (a) comprises ash from an organic source. By this we mean to refer to the ash obtained from the incineration, pyrolysis or gasification of an organic material. This may be provided by the combustion of any organic material. For example in some embodiments component (a) may comprise the incinerated, pyrolysed or gasified waste from a water treatment plant or the ash obtained from the incineration, pyrolysis or gasification of a digestate cake obtained from an anaerobic digestion plant.

Organic ashes suitable for use in the present invention include high carbon materials commonly known as biochar.

Preferably component (a) comprises wood ash.

By wood ash we mean to refer to the residue remaining following the incineration, gasification or pyrolysis of wood. Component (a) may comprise any suitable source of wood ash. One preferred source is the incinerated waste from wood fired power stations. The ash produced in wood fired power stations typically contains light levels of compounds which can provide nutrients to plants, such as sources of phosphorus, calcium, potassium and magnesium.

Preferably the wood ash comprises metal oxides, for example calcium oxide, magnesium oxide and potassium oxide as well as carbonates, for example calcium carbonate, phosphorus oxides and phosphate compounds may also be present.

Other preferred sources of wood ash include waste from a gasification plant or waste from a pyrolysis plant.

Typically wood ash comprises at least 10 wt % calcium salts, preferably at least 15 wt %.

Component (a) may comprise a mixture of two or more ashes from organic sources.

Component (b) comprises an anaerobic digestate.

As the skilled person will appreciate an anaerobic digestate is the material left following anaerobic digestion of a biodegradable feedstock. In some preferred embodiments the digestate is a methanogenic digestate.

Suitably the anaerobic digestate is provided as an aqueous composition, typically in the form of a sludge or slurry.

The anaerobic digestate may be obtained from the anaerobic digestion of any suitable material, for example grass silage, chicken litter, cattle slurry, wholecrop rye, energy beet, potato, wheat straw, chicken manure, cattle manure with straw, pig manure, food waste, food processing waste and sewage sludge.

Typically the anaerobic digestate is obtained from the anaerobic digestion of food waste or from the anaerobic digestion of farm slurry, for example pig or cow manure or chicken waste.

In some embodiments the anaerobic digestate may be obtained from an anaerobic digestion step in the processing of sewage.

In some embodiments the present invention may use the anaerobic digestate from animal waste wherein the animal waste is not separated from organic matter admixed therewith prior to digestion. For example sawdust or silage which is mixed with animal waste may be added to an anaerobic digester. The animal manure may be digested under anaerobic conditions but the cellulose or other organic matter present in the sawdust or silage may not be fully digested. However the resultant mixture comprising an anaerobic digestate and partially decomposed organic matter including cellulosic fibres could be used as component (b) in step (i).

Component (b) may comprise a mixture of two or more anaerobic digestates.

In some preferred embodiments step (i) further comprises the addition of (c) a source of nitrate ion and/or a source of sulfate ion.

In such embodiments step (i) of the method involves admixing (a) ash from an organic source with (b) an anaerobic digestate and (c) a source of sulfate ion and/or a source of nitrate ion.

In some embodiments component (c) comprises a source of sulfate ions.

Suitably the source of sulfate ion is a metal or ammonium salt. Preferably the source of sulfate ion is a metal salt, preferably an alkali metal or alkaline earth metal salt.

In some embodiments the sulfate ion is provided a water soluble form.

In some preferred embodiments the sulfate is provided as a calcium salt.

The source of sulfate may be provided as a solid or a liquid. It may suitably be provided as a slurry.

In some embodiments the source of sulfate ion is provided as an aqueous solution or suspension. In some preferred embodiments the sulfate is added in solid form, suitably as a powder.

The source of sulfate ion may be a natural material or a waste material from an industrial farming process.

For example, in some embodiments the source of sulfate ion comprises gypsum.

Gypsum (calcium sulfate dihydrate, $CaSO_4 \cdot 2H_2O$) is the main product of desulfurization system for the removal of $SO_x$ at fossil-fuel power plants.

In some embodiments the source of sulfate ion comprises a waste stream from an industrial process. For example the source of sulfate ion may comprise the residue from an industrial scrubbing process, for example used limestone scrubbers from a coal fired power station. In some preferred embodiments the source of sulfate ion is the waste stream from the desulfurization system for the removal of $SO_x$ at fossil-fuel power plants.

Preferably the source of sulfate is solid powdered gypsum.

In some embodiments component (c) comprises a source of nitrate ion.

Suitably the source of nitrate ion is a water soluble nitrate salt. Suitable nitrate salts include alkali metal, alkaline earth metal and ammonium salts.

A preferred source of nitrate ions is calcium nitrate.

The source of nitrate ion may be provided as a solid or a liquid.

In some embodiments the source of nitrate may comprise a waste material.

For example, in some embodiments the source of nitrate may comprise a waste stream from the ODDA/nitrophosphate process. Such a waste stream will also comprise phosphate residues thus providing a source of phosphorous in the fertiliser composition obtained by the method of the invention.

In some embodiments the source of nitrate may comprise waste from the scrubbing of combustion exhausts with nitric acid.

In some embodiments the source of nitrate ion is nitric acid.

In some embodiments the source of nitrate ion is calcium nitrate provided by the reaction of wood ash and nitric acid.

Component (c) may comprise a source of nitrate ion and a source of sulfate ion.

Component (c) may comprise two or more sources of nitrate ion and/or two or more sources of sulfate ion.

Step (i) of the method of the present invention involves admixing (a) an organic ash and (b) an anaerobic digestate. This typically involves admixing a wet component and a dry component.

Since the ash is obtained from the incineration, pyrolysis or gasification of organic matter it is very dry and typically comprises less than 2 wt % moisture, preferably less than 1 wt %.

Anaerobic digestates vary but typically comprise from 20 to 35% solid material and from 80 to 65 wt % water.

The source of sulfate ion and/or the source of nitrate ion when present may be provide as a wet composition (typically an aqueous composition) or as a dry component.

Preferably component (c) is provided as a solid. Preferably component (c) is provided as a dry solid. It may comprise water of crystallisation but preferably is not mixed with additional water. Preferably component (c) is comprises gypsum.

Preferably the composition obtained in step (i) comprises less than 50 wt % water, preferably less than 40 wt %, preferably less than 30 wt %, more preferably less than 20 wt %, preferably less than 18 wt %.

Preferably the weight ratio of component (a) to component (b) used in step (i) is from 1:5 to 5:1, preferably from 1:2 to 2:1.

The ratio used depends on the nature of the anaerobic digestate and the water content thereof.

Preferably component (c) is added to provide less than 30 wt % of the composition obtained in step (i), preferably less than 20 wt %, preferably less than 10 wt %, preferably less than 5 wt %, for example 2 to 3 wt %.

The amount of sulfate and/or nitrate added depends on the concentration of ammonia present in the anaerobic digestate.

For the avoidance of doubt when mixtures are used the above amounts refer to the total amount of each component present in the composition.

The method of the first aspect may further involve a step (ii) of contacting the composition provided in step (i) with a composition comprising carbon dioxide.

The composition comprising carbon dioxide may consist essentially of carbon dioxide and/or it may comprise a mixture of carbon dioxide and one or more further components.

In some embodiments the carbon dioxide may be provided in solid form.

Preferably step (ii) involves contacting the composition provided in step (i) with (d) a composition comprising carbon dioxide wherein the composition is in gaseous form. The composition may comprise neat carbon dioxide gas and/or it may comprise a gaseous mixture of carbon dioxide and one or more further gases.

Preferably component (d) comprises at least 5 vol % carbon dioxide, preferably at least 10 vol %, preferably at least 20 vol %.

Component (d) may comprise at least 50 vol % carbon dioxide, suitably at least 60 vol %, for example at least 80 vol %, at least 90 vol % or at least 95 vol %.

In some embodiments step (ii) involves contacting the composition provided in step (i) with neat carbon dioxide gas.

In some embodiments step (ii) involves contacting the mixture obtained in step (i) with the exhaust gas from combustion, for example the combustion of fossil fuel. For example step (ii) may involve contacting the flue gases from a power station with the composition provided in step (a).

The use of flue gases to provide the carbon dioxide is highly beneficial because the $SO_x$ and NOx gases present in the flue gas mixture may also dissolve in the composition and provide additional nutrients in the final fertiliser composition in the form of sulphates and nitrates.

In some especially preferred embodiments the source of carbon dioxide is biogas and step (ii) involves contacting the composition provided in step (i) with biogas.

Biogas describes the mixture of methane and carbon dioxide that is obtained during anaerobic digestion. It may also comprise other gases in minor amounts, for example hydrogen sulphide. The exact levels of carbon dioxide and methane present in biogas depends on the mixture that has been digested and the digestion conditions. Typically biogas comprises from 20 to 80 vol % carbon dioxide, for example 30 to 70 vol %. In some embodiments biogas comprises from 40 to 45 vol % carbon dioxide and 55 to 60 vol % methane.

In some embodiments the composition comprising carbon dioxide may comprise the exhaust gases from the combustion of biogas, or of methane recovered from biogas.

One particular advantage of the method of the present invention is that it can use both the digestate and the biogas produced during anaerobic digestion.

In some preferred embodiments in which the composition comprising carbon dioxide comprises the exhaust gas from the combustion of fossil fuel and/or biogas, the hot gas mixture may be first contacted with a heat exchanger to capture heat energy from said gases.

During step (ii) the carbon dioxide which is contacted with the composition provided in step (i) is suitably retained within and forms part of a new composition. Thus step (ii) suitably removes carbon dioxide from the source of carbon dioxide that it is contacted with. Thus in some embodiments step (ii) may involve capturing carbon dioxide from an exhaust gas produced by combustion, for example of fossil fuel.

In some preferred embodiments step (ii) involves removing carbon dioxide from biogas. The resulting biogas thus has an increased relative concentration of methane and will therefore burn more easily. Thus the present invention may provide a method of enriching biogas.

Although hot gases and an exothermic reaction may be involved in step (ii), preferably no external source of heat is supplied to the system.

In some embodiments the method of the present invention may involve the addition of one or more further components. Preferably the one or more further components provides a further source of one or more nutrients.

The one or more further components may be added before, after or during step (i); and/or before, during or after step (ii).

In preferred embodiments the one or more further components comprises a waste material.

In some embodiments the method of the present invention further involves adding a source of phosphorus.

The source of phosphorus may be added at any stage. Suitable sources of phosphorous include the incinerated bones of animals.

The source of phosphorus may be added before, after or during step (i); and/or before, during or after step (ii).

Phosphorus may be present in an anaerobic digestate provided in step (a) and/or step (b) (ii).

A waste stream from the ODDA/nitrophosphate process may be used to provide a source of nitrate and a source of phosphorus.

Further or alternative sources of phosphorus may be also added.

The material obtained following steps (i) and (ii) of the method of the present invention can be used directly as a soil conditioning agent. It contains many of the minerals that plants need for growth. It also provides a useful means of storing carbon dioxide.

This product obtained after steps (i) and optional step (ii) can be used directly as a soil conditioning agent or can be further processed to provide an easier to handle form.

In some embodiments the method of the present invention may involve a further step (iii) of further processing the material obtained in step (i) and optional step (ii). The further processing step (iii) may involve drying, pulverising and/or granulating the material. Such processing methods will be known to the person skilled in the art.

Preferably step (iii) involves pelletising the material obtained after steps (i) and optional step (ii). It has been advantageously found that this material is easily pelletised. The pellets do not clump together and are easy to apply.

According to a second aspect of the invention there is provided a soil conditioning agent obtained by the method of the first aspect.

Preferred features of the second aspect are as defined in relation to the first aspect.

Further preferred features of the first and second aspects of the present invention will now be described.

Unlike many fertiliser compounds the soil conditioning agent of the invention does not always comprise high levels of nitrogen.

The soil conditioning agent provided by the present invention suitably comprises at least 5 wt % carbon, suitably at least 10 wt %.

In some embodiments the soil conditioning agent may comprise at least 20 wt % carbon, preferably at least 30 wt %, for example at least 40 wt %. In some embodiments the soil conditioning agent provided by the present invention comprises from 50 to 60 wt % carbon.

Suitably the soil conditioning agent comprises from 1 to 5 wt % nitrogen, preferably 2 to 3 wt %.

In some embodiments higher levels of nitrogen may be present.

Suitably the soil conditioning agent comprises 0.1 to 5 wt % potassium, preferably 1 to 2 wt %.

Suitably the soil conditioning agent comprises 0.1 to 5 wt % phosphorus, preferably 1 to 2 wt %.

The present invention offers significant advantages in that it uses multiple waste products to generate a useful fertiliser composition. For example the present invention can make use of an anaerobic digestate which is generally considered unsuitable for direct use as a fertiliser, as it is in the form of a sludge and thus difficult to apply. By admixing with ash from an organic source according to the invention, an easier to handle soil conditioning agent is provided. Furthermore the invention can make use ash from the incineration of a digestate cake and optionally the biogas produced during anaerobic digestion. Thus the present invention can be put into effect at a location where anaerobic digestion is taking place.

A further advantage of some soil conditioning agents of the present invention is that they may be used on soil which has been certified as organic.

The soil conditioning agent of the invention is highly beneficial. It provides a stable store for carbon and offers many benefits to the soil. The way in which the organic carbon from the ash interacts with nitrogen, phosphorus and potassium in the anaerobic digestate means that these nutrients are provided in a form having high bioavailability.

The inventors have found that nutrients are less likely to run off, evaporate or be washed away. They are retained at the soil surface for longer periods than when provided by conventional fertilisers.

The soil conditioning agent provides improves aeration of the soil. The porosity and quality of the soil surface are improved.

The invention may suitably provide the use of a soil conditioning agent obtained by the method of the first aspect to improve the bioavailability of minerals, especially nitrogen, at the surface of the soil.

The invention may provide the use of a soil conditioning agent obtained by the method of the first aspect to increase the porosity of the surface of the soil.

The invention may provide the use of a soil conditioning agent obtained by the method of the first aspect to reduce loss of nitrogen at the soil surface due to evaporation.

The invention may provide the use of a soil conditioning agent obtained by the method of the first aspect to reduce loss of nitrogen at the soil surface due to leaching.

The invention may provide the use of a soil conditioning agent obtained by the method of the first aspect to reduce emissions of nitrous oxide.

The invention will now be further described with reference to the following non-limiting examples.

Example 1

A soil conditioning agent was prepared as follows:

Ash material was collected from the gasification of spruce wood and added to an anaerobic digestate in an atmosphere of carbon dioxide. When the temperature stopped increasing, gypsum was added.

The weight ratio of digestate to ash to gypsum was approximately 64:34:2.

The material was formed into pellets having a diameter of 3 mm and pellets having a diameter of 6 mm.

Figure 1:
FIG. 1 shows 6 mm pellets prepared according to Example 1.

The 6 mm pellets are shown in FIG. 1.

Example 2

A leaching study was carried out in which pellets of the material obtained in Example 1 were compared with an ammonium nitrate fertiliser.

Three glass columns were filled with sand. Pellets of each of the test materials were added to two columns. To the other column an equivalent amount (by nitrogen content) of ammonium nitrate fertiliser was added.

Each day an amount of water equivalent to the UK average rainfall was added dropwise to each column.

The nitrogen content of soil 20 cm below the surface was measured each day.

Figure 2:
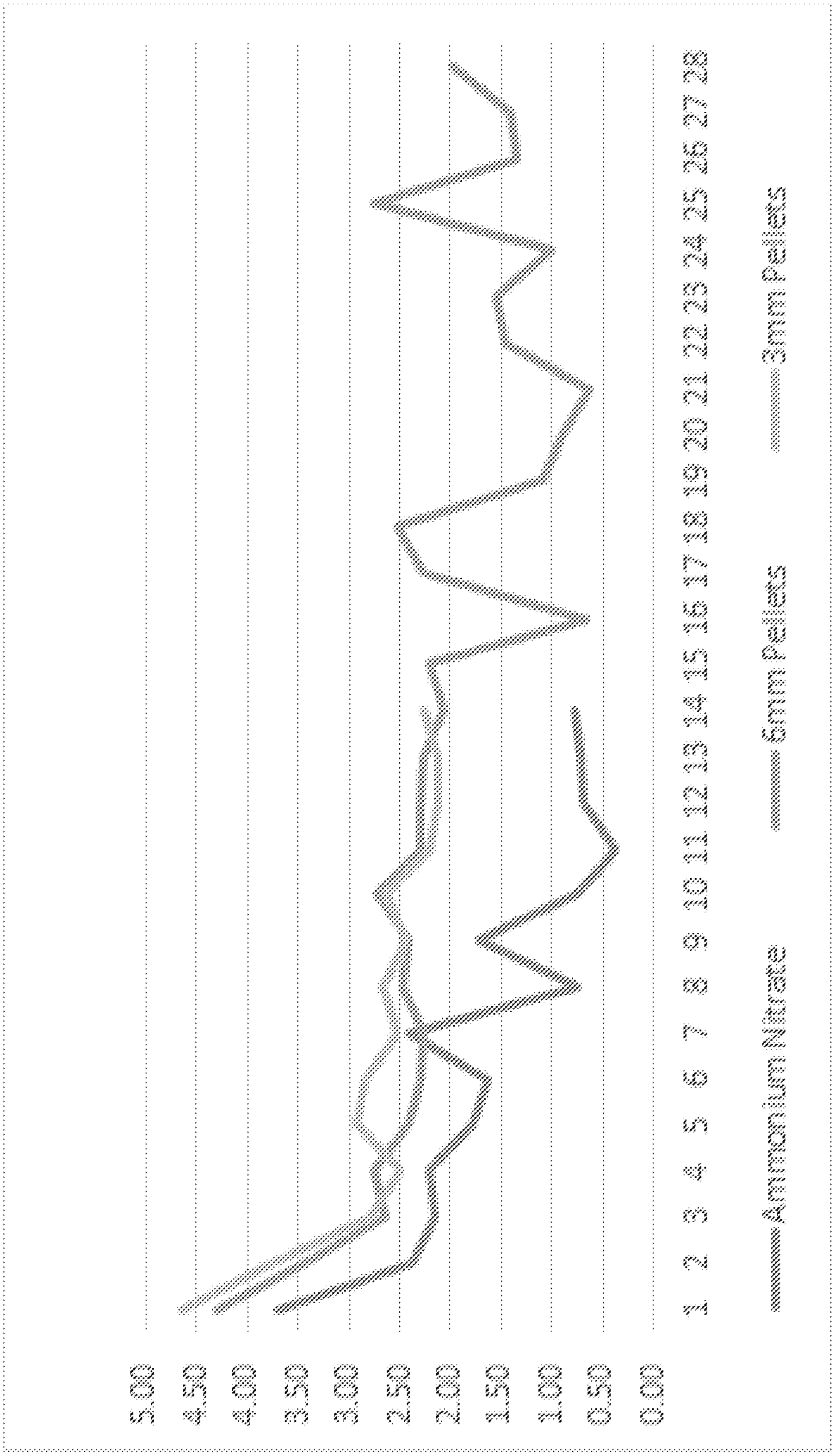
FIG. 2 is a graph showing nitrogen content measurements recorded during the leaching study of Example 2.

The results in FIG. 2 show the nitrogen content recorded over 14 days. For the 6 mm pellets the content was recorded for a further 28 days.

The invention claimed is:

1. A method of producing a soil conditioning agent, the method comprising:

(i) admixing (a) ash from an organic source with (b) an anaerobic digestate, wherein the composition obtained in step (i) comprises less than 30 wt % water; and (ii) contacting the composition provided in step (i) with a composition comprising carbon dioxide.

2. A method according to claim 1, which further includes the addition in step (i) of (c) a source of nitrate ion and/or a source of sulfate ion.

3. A method according to claim 2 wherein component (c) comprises gypsum.

4. A method according to claim 2 wherein step (i) involves admixing by weight 1 part of component (a) with 1.5 to 2.5 parts component (b) and 0.01 to 0.05 parts component (c).

5. A method according to claim 1 wherein component (a) comprises wood ash.

6. A method according to claim 1 wherein the composition obtained in step (i) comprises less than 20 wt % water.

7. A method according to claim 1 which further involves a step (iii) of pelletising the material obtained after steps (i) and step (ii).

8. A method of improving the bioavailability of minerals, especially nitrogen, at the surface of the soil comprising administering to the soil the soil conditioning agent obtained by the method of claim 1.

9. A method of increasing the porosity of the surface of the soil comprising administering to the soil the soil conditioning agent obtained by the method of claim 1.

10. A method of reducing loss of nitrogen at the soil surface due to evaporation comprising administering to the soil the soil conditioning agent obtained by the method of claim 1.

11. A method of reducing loss of nitrogen at the soil surface due to leaching comprising administering to the soil the soil conditioning agent obtained by the method of claim 1.

12. A method of reducing emissions of nitrous oxide comprising administering to the soil the soil conditioning agent obtained by the method of claim 1.

* * * * *